US008232893B2

(12) United States Patent
Endo et al.

(10) Patent No.: US 8,232,893 B2
(45) Date of Patent: Jul. 31, 2012

(54) PARKING ASSIST APPARATUS AND METHOD

(75) Inventors: Tomohiko Endo, Toyota (JP); Yasushi Makino, Mishima (JP); Yuichi Kubota, Okazaki (JP); Yukiko Kawabata, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 304 days.

(21) Appl. No.: 12/296,301

(22) PCT Filed: Feb. 28, 2007

(86) PCT No.: PCT/JP2007/053824
§ 371 (c)(1),
(2), (4) Date: Oct. 7, 2008

(87) PCT Pub. No.: WO2007/122862
PCT Pub. Date: Nov. 1, 2007

(65) Prior Publication Data
US 2009/0174574 A1 Jul. 9, 2009

(30) Foreign Application Priority Data
Apr. 25, 2006 (JP) ................................. 2006-120975

(51) Int. Cl.
*G08G 1/095* (2006.01)
(52) U.S. Cl. ........................................ 340/908; 340/454
(58) Field of Classification Search .................. 340/104, 340/932.2, 1, 908, 454, 451; 701/36, 1; 303/3, 303/9.63
See application file for complete search history.

(56) References Cited

U.S. PATENT DOCUMENTS

2006/0069478 A1* 3/2006 Iwama ............................ 701/36

FOREIGN PATENT DOCUMENTS

| EP | 1 642 808 | 4/2006 |
|----|-----------|--------|
| JP | 10-114274 | 5/1998 |
| JP | 2003-54341 | 2/2003 |
| JP | 2004-034946 | 2/2004 |
| JP | 2004-114977 | 4/2004 |
| JP | 2005-9992 | 1/2005 |
| JP | 2005-343417 | 12/2005 |
| JP | 2006-008009 | 1/2006 |

OTHER PUBLICATIONS

First Office Action for Chinese Application No. 200780014178.X dated Jul. 9, 2010.
Extended European Search Report for EP Application No. 07737543.4, dated May 7, 2010.
Office Action from the Japanese Patent Office for JP 2006-120975, mailed Sep. 1, 2009.

* cited by examiner

*Primary Examiner* — Shirley Lu
(74) *Attorney, Agent, or Firm* — Finnegan, Henderson, Farabow, Garrett & Dunner, LLP (57) ABSTRACT

It is an object of the present invention to provide a parking assisting apparatus which can selectively determine an appropriate target parking position, which can be used for parking assisting, with an appropriate priority, by appropriately using obstacle detecting means and parking space detecting means in a coordinated fashion. The present invention is a parking assisting apparatus for assisting parking a vehicle, comprising the obstacle detecting means for detecting an obstacle near the vehicle; and parking section line detecting means for detecting a parking section line painted on the ground; wherein if the parking section line is detected by the parking section line detecting means, the apparatus calculates the target parking position based on the detected parking section line.

10 Claims, 7 Drawing Sheets

PARKING ASSIST APPARATUS AND METHOD

CROSS-REFERENCE TO RELATED APPLICATIONS

This application is a national phase application of International Application No. PCT/JP2007/053824, filed Feb. 28, 2007, and claims the priority of Japanese Application No. 2006-120975, filed Apr. 25, 2006, the contents of both of which are incorporated herein by reference.

TECHNICAL FIELD

The present invention relates to a parking assisting apparatus and method for assisting parking a vehicle.

BACKGROUND ART

JP2003-54341 A discloses a parking assisting apparatus comprising obstacle detecting means for detecting an obstacle near the vehicle; a vehicle motion calculating section configured to calculate vehicle position and vehicle orientation in a two-dimensional plane based on steering angle and vehicle speed; and a target parking position determining section configured to detect a parking space based on the vehicle motion calculated by the vehicle motion calculating section and the relative positional relationship with respect to the detected obstacle and determine the target parking position.

By the way, in an actual parking situation, drivers generally park vehicles such that the vehicles are appropriately accommodated within the parking section line, while they look at the parking section line painted on the ground to use it as a target.

In this connection, according to the parking assisting apparatus of JP2003-54341 A, since the target parking position is determined only based on the relationship between the vehicle and the obstacle adjacent to the parking space, the problem is that the target parking position which is biased with respect to the parking section line is determined if another vehicle which is detected as an obstacle is parked in a biased manner with respect to the neighboring parking section line, for example.

Although the parking section line can be detected by image recognition or the like using a camera, there may be a situation where the parking section line cannot be detected due to influence of insufficient light at night, insufficient coverage of the camera, snow cover, etc., or the fact that no parking section line is painted in the first place. Thus, it is desirable to be able to determine the target parking position which can be used for the parking assisting even in such a situation.

Furthermore, there is a situation where a target track cannot be generated to guide the vehicle within the parking section line without any bias even in the case where the parking section line can be detected. Thus, it is desirable to be able to determine the target parking position which can be used for the parking assisting even in such a situation.

DISCLOSURE OF INVENTION

Therefore, it is an object of the present invention to provide a parking assisting apparatus which can selectively determine an appropriate target parking position, which can be used for the parking assisting, with an appropriate priority, by appropriately using the obstacle detecting means and the parking space detecting means in a coordinated fashion.

In order to achieve the aforementioned objects, according to the first aspect of the present invention, a parking assisting apparatus for assisting parking a vehicle comprises;

obstacle detecting means for detecting an obstacle near the vehicle; and parking section line detecting means for detecting a parking section line painted on the ground; wherein if the parking section line is detected by the parking section line detecting means, said apparatus calculates a target parking position based on the detected parking section line. According to the first aspect of the present invention, if the parking section line is detected by the parking section line detecting means, the target parking position is calculated based on the detected parking section line. Therefore, it is possible to set an appropriate target parking position even in a situation where another vehicle which is detected as an obstacle is parked in a biased manner with respect to the neighboring parking section line, for example.

According to the second aspect of the present invention, in the first aspect of the present invention, the parking section line detecting means detects the parking section line by processing an image of surroundings captured by imaging means mounted on the vehicle, and an area in the image to be processed is determined based on a detection result of the obstacle detecting means. With this arrangement, it is possible to efficiently detect the parking section line in the image by using the detection result of the obstacle detecting means.

According to the third aspect of the present invention, in the first aspect of the present invention, if a parking space is detected based on the detection result of the obstacle detecting means, the area in the image to be processed by the parking section line detecting means is set at least within the detected parking space. With this arrangement, it is possible to efficiently detect the parking section line which may exist within the parking space.

According to the fourth aspect of the present invention, in any one of the aforementioned aspects of the present invention, if the parking section line is detected by the parking section line detecting means, said apparatus calculates a target parking position based on the detected parking section line. With this arrangement, it is possible to calculate the target parking position which can be used for the parking assisting, even in the situation where the parking section line cannot be detected due to influence of insufficient light at night, snow cover, etc.

According to the fifth aspect of the present invention, in any one of the aforementioned aspects of the present invention, if the parking section line is detected by the parking section line detecting means and a target track, along which the parking assisting for the detected parking section line can be implemented, can be generated, said apparatus calculates a target parking position based on the detected parking section line. With this arrangement, it is possible to avoid setting the target parking position which cannot be used for the parking assisting, by setting the target parking position calculated based on the parking section line on a priority basis.

According to the sixth aspect of the present invention, in one of any aforementioned aspects of the present invention, the parking assisting apparatus further comprises information outputting means for outputting a guiding message for assisting in driving the vehicle to a parking start position if a parking space is detected based on the detection result of the obstacle detecting means, wherein under the situation where the guiding message has been outputted by the information outputting means, if the parking section line is not detected by the parking section line detecting means or a target track along which the parking assisting for the detected parking section line can be implemented cannot be generated in spite of the fact that the parking section line is detected by the parking section line detecting means, said apparatus calculates a target parking position based on the detection result of the obstacle detecting means. With this arrangement, it is possible to avoid such a situation where the parking assist for the detected parking space cannot be performed in spite of the fact that the guiding message has been outputted, which otherwise could impose an inconvenience on the driver.

According to the seventh aspect of the present invention, a parking assisting method of assisting parking a vehicle comprises:

an obstacle detecting step for detecting an obstacle near the vehicle;

a parking section line detecting step for detecting a parking section line painted on the ground, said step being carried out in a stage where the vehicle reaches a parking start position after the obstacle detecting step; and a target parking position calculating step for calculating a target parking position, said step being carried out after the parking section line detecting step, wherein in the target parking position calculating step the target parking position is calculated based on the detected parking section line if the parking section line is detected in the parking section line detecting step.

According to the eighth aspect of the present invention, a parking assisting method of assisting parking a vehicle comprises:

an obstacle detecting step for detecting an obstacle near the vehicle;

a parking space detecting step for detecting parking space adjacent to the obstacle based on the detection result in the obstacle detecting step;

an information outputting step for outputting a message for notifying a driver of the parking space when the parking space is detected in the parking space detecting step;

a parking section line detecting step for detecting a parking section line painted on the ground, said step being carried out under a situation where the vehicle reaches a parking start position after the information outputting step;

a determining step for determining whether a target track, along which the parking assisting for the detected parking section line can be implemented, can be generated, said step being carried out if the parking section line is detected in the parking section line detecting step; and a target parking position calculating step for calculating a target parking position, wherein in the target parking position calculating step the target parking position is calculated based on the parking space detected in the parking space detecting step, if the parking section line is not detected in the parking section line detecting step or it is determined that the target track cannot be generated in the determining step.

According to the present invention, a parking assisting apparatus and method can be gained which can selectively determine an appropriate target parking position, which can be used for the parking assisting, with an appropriate priority, by appropriately using the obstacle detecting means and the parking space detecting means in a coordinated fashion.

BRIEF DESCRIPTION OF THE DRAWINGS

These and other objects, features, and advantages of the present invention will become more apparent from the following detailed description of preferred embodiments given with reference to the accompanying drawings, in which.

EXPLANATION FOR REFERENCE NUMBER 10 parking assisting apparatus
12 parking assisting ECU
16 steering angle sensor
18 vehicle speed sensor
20 back monitoring camera
22 display
30 steering system ECU
41 deflection angle calculating section
42 parking space detecting section
44 target parking position calculating section
46 parking start position calculating section
47 information output control section
48 target track calculating section
50 reverse shift switch
52 parking switch
70 distance-measuring sensor

BEST MODE FOR CARRYING OUT THE INVENTION

In the following, the best mode for carrying out the present invention will be described in detail by referring to the accompanying drawings.

Figure 1:
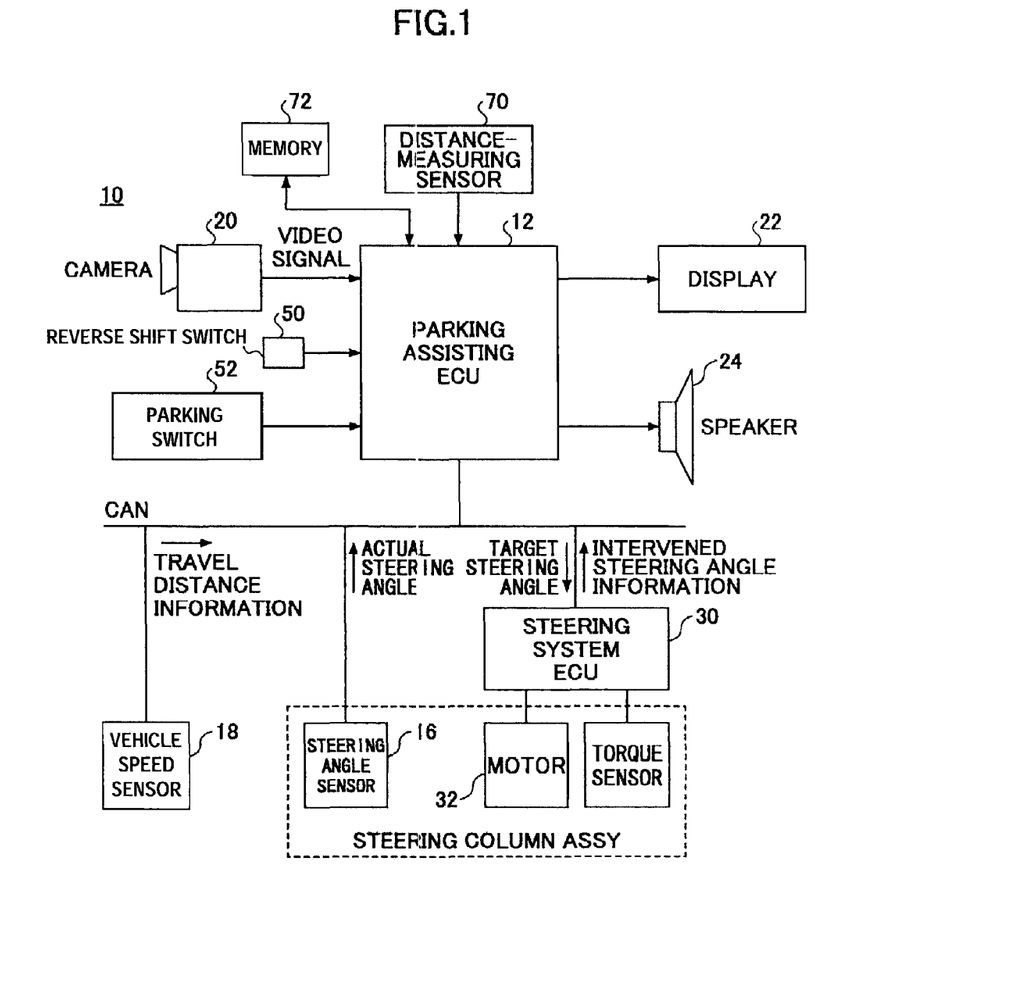
FIG. 1 is a system diagram of an embodiment of a parking assisting apparatus 10 according to the present invention.

FIG. 1 is a system diagram of an embodiment of a parking assisting apparatus 10 according to the present invention. As shown in FIG. 1, the parking assisting apparatus 10 is comprised mainly of an electronic control unit 12 (hereafter referred to as a parking assisting ECU 12). The parking assisting ECU 12 is comprised mainly of a microprocessor that includes a CPU, a ROM, a RAM, etc., (not shown) which are interconnected via appropriate buses. In the ROM are stored the computer readable programs to be carried out by the CPU and data.

The parking assisting ECU 12 is connected to a steering angle sensor 16 for detecting the steering angle of the steering wheel (not shown), and a vehicle speed sensor 18 for detecting the speed of the vehicle, via appropriate buses such as a CAN (Controller Area Network) or a high-speed communication bus. The vehicle speed sensor 18 may be wheel speed sensors provided on individual wheels, each of which generates pulse signals according to the rotating speed of the corresponding wheel.

The parking assisting ECU 12 is connected to a distance-measuring sensor 70 which measures the distance with respect to an obstacle using sound waves (for example, sonic waves), radio waves (for example, millimeter waves), light waves (for example, lasers), etc. The distance-measuring sensor 70 may be any means which can detect a distance such as a stereo vision camera, other than laser radar, millimeter wave radar, and sonic wave sonar, for example. The distance-measuring sensor 70 is provided on either side of the front body of the vehicle.

Figure 2:
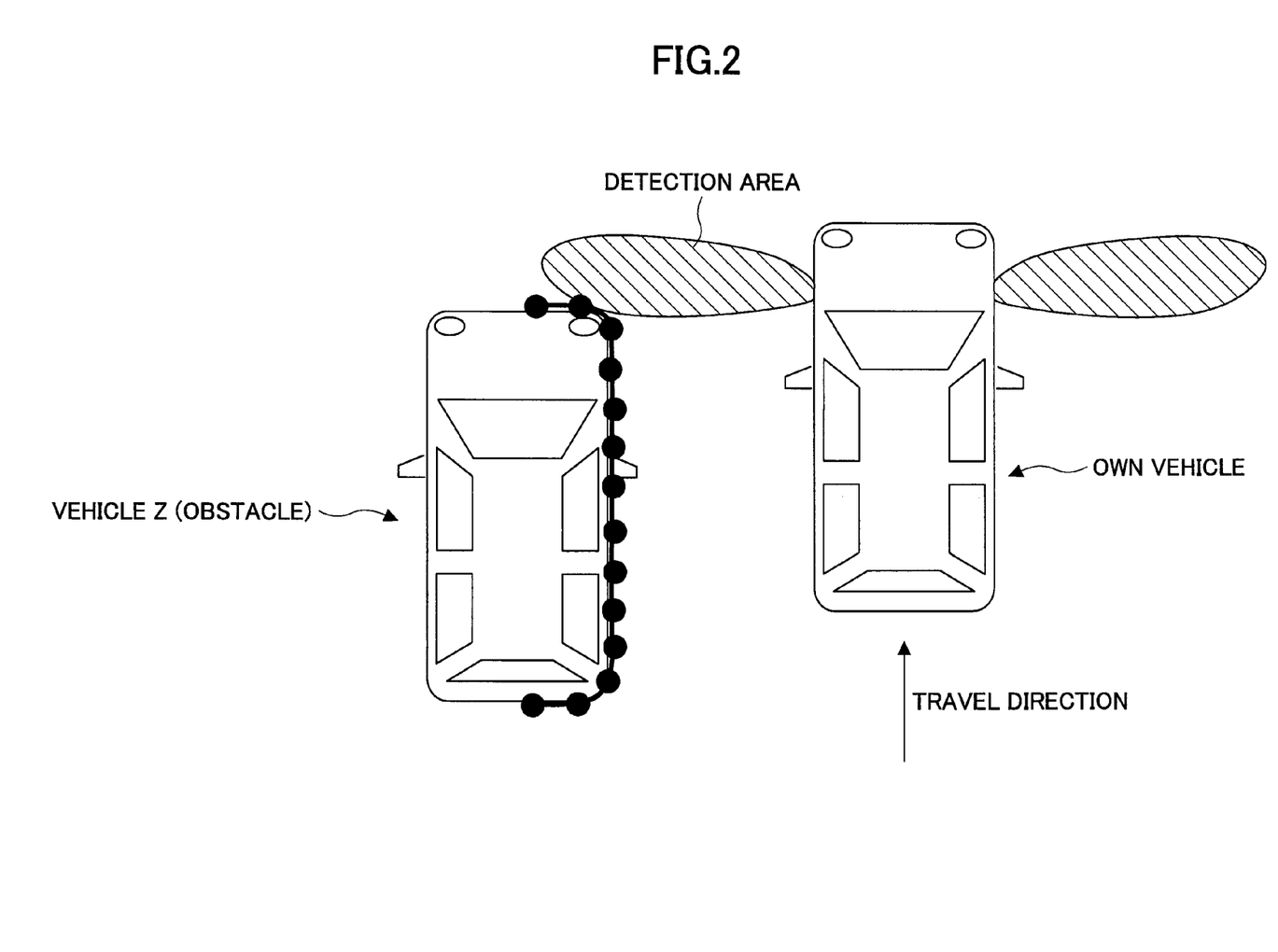
FIG. 2 is a diagram for illustrating how the distance-measuring sensor 70 detects the distance with respect to the object to be detected.

The distance-measuring sensor 70 detects the distance with respect to the obstacle located on the side of the vehicle by emitting sound waves or the like in a predetermined area, and then receiving the reflected waves, as shown in FIG. 2. The distance-measuring sensor 70 may be disposed near a bumper of the front body of the vehicle and may emit sound waves or the like in a slanting forward direction which forms an angle ranging from 17 degrees to 20 degrees with respect to the lateral direction of the vehicle, for example. The distance-measuring sensor 70 may output a row of points (i.e., a group comprised of reflected points of the sound wave) representing reflections from portions of the obstacle. The output data may be stored periodically in a memory 72 (for example, EEPROM).

The parking assisting ECU 12 is also connected to a reverse shift switch 50 and a parking switch 52. The reverse shift switch 50 outputs an ON signal when a shift lever is shifted to the reverse position and otherwise outputs an OFF signal. The parking switch 52 is provided in the cabin of the vehicle so as to allow a user in the cabin to operate it. The parking switch 52 outputs an OFF signal in its normal state and outputs an ON signal when operated by the user.

The parking assisting ECU 12 determines whether the user needs assistance in parking the vehicle based on the output signal of the parking switch 52. The parking assisting ECU 12 starts parking assist control for assisting the vehicle's travel to a target parking position in the parking space, as soon as the parking switch 52 is turned on during the travel of the vehicle. The parking assist control includes not only vehicle control in the course of travel to the target parking position, such as steering control, but also information output to the driver such as a guide message for guiding the vehicle to the parking start position.

Figure 3:
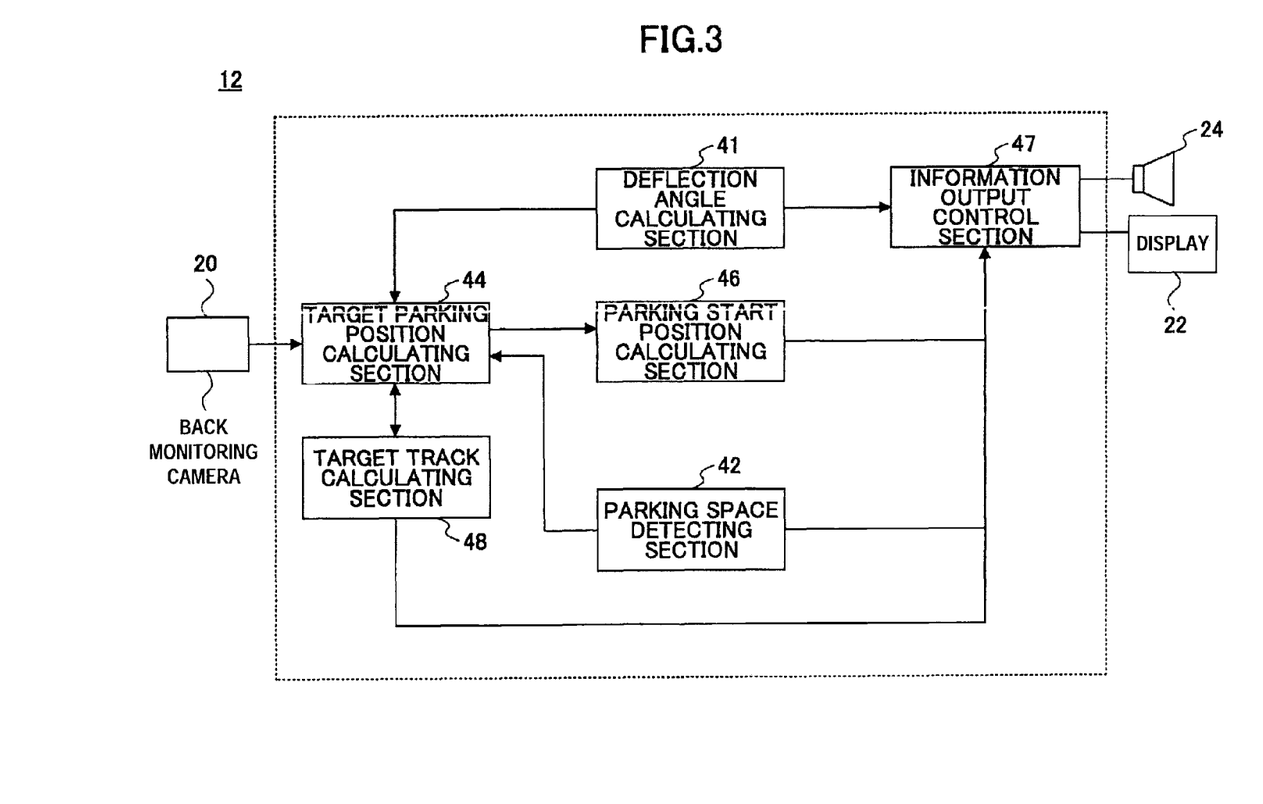
FIG. 3 is a functional diagram for illustrating main functions of the parking assisting ECU 12 according to the present embodiment.

FIG. 3 is a functional diagram for illustrating main functions of the parking assisting ECU 12 according to the present embodiment. The parking assisting ECU 12 includes a deflection angle calculating section 41, a parking space detecting section 42, a target parking position calculating section 44, a parking start position calculating section 46 and a information output control section 48. In the following, the configurations and functions of the respective sections will be described.

The respective outputs of the steering angle sensor 16 and vehicle speed sensor 18 (see FIG. 1) are input to the deflection angle calculating section 41 periodically. The deflection angle calculating section 41 calculates the deflection angle α in the predetermined section based on the respective outputs of the steering angle sensor 16 and vehicle speed sensor 18. The predetermined section starts from the point a predetermined distance (7 m, for example) before the current vehicle position and ends at the point of the current vehicle position, for example. It is noted that the sign of the deflection angle α is defined as such that a positive sign corresponds to the clockwise direction and a negative sign corresponds to the counter clockwise direction. Here, in general, the deflection angle α can be calculated by the following formula (1), using minute travel distance ds of the vehicle and curvature γ of roads (γ corresponds to the reciprocal of cornering radius R of the vehicle). According to this formula (1), the amount of change in orientation of the vehicle within a travel distance of βm (in this example, β=7) before the current vehicle position is calculated as the deflection angle α.

$$\alpha = \int_{-\beta}^{0} \gamma \cdot ds \quad (1)$$

The parking assisting ECU 12 of the present embodiment calculates minute deflection angle $\alpha_i$ at every predetermined distance (0.5 m, in this example) based on the following formula (2) which is transformed formula (1) and calculates the deflection angle α by summing the calculated respective minute deflection angle $\alpha_{1 \sim k}$.

$$\alpha = \sum_{i=1}^{k} \alpha_i \alpha_i = \int_{-0.5}^{0} \gamma \cdot ds \quad (2)$$

At this time, the predetermined distance (0.5 m, in this example) is monitored by integrating in time the output signals of the vehicle speed sensor 18 (i.e., wheel speed pulses). Further, road curvature γ is determined based on the steering angle Ha obtained from the steering angle sensor 16, using the relationship γ=Ha/L·η (where L is the length of the wheelbase, and η is an overall gear ratio of the vehicle, that is to say, the ratio of the steering angle Ha to the steering angle of the wheel), for example. It is noted that the minute deflection angle $\alpha_i$ may be calculated, for instance, by multiplying the road curvature γ obtained every 0.01 m of minute travel distance by that minute travel distance 0.01 m, and integrating these multiplied values obtained every 0.05 m of travel distance. It is noted that the relationship between the road curvature γ and the steering angle Ha may be stored in the ROM of the parking assisting ECU 12 in the form of a map generated based on correlation data obtained in advance on a vehicle type basis.

It is noted that it is desirable for the detection results of the steering angle sensor 16 and the vehicle speed sensor 18 (or data of minute deflection angle $\alpha_i$ derived therefrom) to be stored even in the situation where the parking switch 52 is turned on, as is the case with the detection results of the distance-measuring sensor 70. With this arrangement, when the parking switch 52 is not turned on, it is possible to calculate the deflection angle α in the section before the vehicle position at that time. Therefore, it is possible to determine the criteria for outputting information as soon as the parking switch 52 has been turned on. For this purpose, it is also possible to store only the outputs of the steering angle sensor 16 and the vehicle speed sensor 18 obtained within a predetermined distance of 7 m before the current vehicle position in the memory 72, using the FIFO technique. With this arrangement, it is possible to efficiently use the capacity of the memory 72.

The parking space detecting section 42 detects parking spaces, which may be located on the side of the vehicle, based on the detection result (i.e., row of points) of the distance-measuring sensor 70. The parking space detecting section 42 detects the parking spaces, which may be located on either side of the vehicle, based on the detection result of the distance-measuring sensors 70 provided one on either side of the vehicle. The parking spaces located on each side of the vehicle are detected separately and concurrently. The detecting way can be the same on either side of the vehicle, so in the following, the detecting way related to one side of the vehicle is explained unless otherwise specified.

The way of detecting the parking space based on the detection result (i.e., row of points) may be any adequate one. The way of detecting the parking spaces may be different between parallel parking and tandem parking. In the following, one example of the way of detecting the parking spaces for parallel parking is explained first, and then one example of the way of detecting the parking spaces for tandem parking is explained. It is noted that the parking switch 52 may include a switch for specifying parallel parking or tandem parking. In this case, the parking assisting ECU 12 operates in a parking mode (i.e., parallel parking mode or tandem parking mode) according to the specified parking mode.

[Method of Detecting Parking Spaces for Parallel Parking]

If the row of points whose length is greater than a predetermined length (>1 m) is detected and then the length of a section in which there is no row of points becomes greater than or equal to a predetermined length L1 m, the parking space detecting section 42 determines that there is a parking space on the back side of the obstacle related to the row of points of the predetermined length and sets the parking space available flag. The predetermined length L1 corresponds to a minimum opening width which is necessary as a parking space for parallel parking. The predetermined length L1 is a value which should be defined depending on the width of the own vehicle. It is noted that the predetermined length L1 is 2.5 m in this example.

Further, the parking space detecting section 42 further may detect the orientation of the detected parking space. For example, the parking space detecting section 42 may estimate the orientation of the parking space based on the orientation of the vehicle (the deflection angle $\alpha$, for example) when the vehicle passes by the parking space. Alternatively, it is also possible to determine the orientation of the obstacle by applying liner approximation or approximation of functions to the data of the row of points the distance-measuring sensor 50 outputs, and detect the orientation of the parking space using the determined orientation of the obstacle.

[Method of Detecting Parking Spaces for Tandem Parking]

If no row of points exists for a length greater than or equal to a predetermined length L2 and then the row of points whose length is greater than or equal to 2 m is detected, the parking space detecting section 42 determines that there is a parking space on the front side of the obstacle related to the row of points and sets a parking space available flag. The predetermined length L2 corresponds to a minimum opening width which is necessary as a parking space for tandem parking. The predetermined length L2 is a value which should be defined depending on the length of the own vehicle. It is noted that the predetermined length L2 is 6 m in this example. In this example, if the row of points whose length is greater than a predetermined length (>2.0 m) is detected and then the length of a section in which there is no row of points becomes greater than or equal to a predetermined length L2, the parking space detecting section 42 determines that there is a parking space on the back side of the obstacle related to the set detection completion flag and sets the parking space available flag.

Further, the parking space detecting section 42 may further detect the orientation of the detected parking space. For example, the parking space detecting section 42 may estimate the orientation of the parking space based on the orientation of the vehicle when the vehicle passes by the parking space. Alternatively, it is also possible to determine the orientation of the obstacle by applying liner approximation or approximation of functions to the data of the row of points the distance-measuring sensor 50 outputs, and detect the orientation of the parking space using the determined orientation of the obstacle.

It is desirable for the detection result of the distance-measuring sensor 70 to be stored even in the situation where the parking switch 52 is not turned on. With this arrangement, when the parking switch 52 is turned on, it is possible to retrieve the past detection result obtained before the vehicle position at that time, and detect parking spaces, which may be located on the front side of the current vehicle position, based on the retrieved detection result. For this purpose, it is also possible to store only the outputs of the steering angle sensor 16 and the vehicle speed sensor 18 obtained within a predetermined distance before the current vehicle position in the memory 72, using the FIFO technique. With this arrangement, it is possible to efficiently use the capacity of the memory 72.

The target parking position calculating section 44 determines the target parking position within the detected parking space based on the detection results of the parking space, when the parking space available flag is set. For example, the target parking position calculating section 44 may determine the target parking position (the position of the center of the rear axle of the vehicle in the parking space, for example), based on the end point of the obstacle adjacent to the parking space which is detected based on data of the row of points. The term "target parking position" may include "target parking direction" (i.e., a direction of the vehicle to be implemented when the vehicle has been parked in the parking space) in a broad sense. The target parking direction may be determined based on the orientation of the parking space estimated based on the detection result of the distance-measuring sensor 70.

The parking start position calculating section 46 calculates the parking start position with which the parking assist for parking in the parking space is possible (i.e., the parking start position from which a target track to the target parking position within the parking space can be created), when the parking space available flag is set. For example, the parking start position calculating section 46 considers the maximum cornering curvature of the vehicle, etc., to determine the parking start position (including the direction at the beginning of traveling for parking) with which parking with the determined target parking position (and the target parking direction, the same for the description hereafter) is possible. It is noted that the target parking position including the target direction of the vehicle in the target parking position determined based on the detection result of the distance-measuring sensor 70 is the tentative target parking position which may be changed subsequently. Therefore, the target parking position may be calculated by approximate calculation using the maximum cornering curvature of the vehicle, etc. Further, from a similar viewpoint, since the parking start position with which the parking assist for the parking space is possible is not only one point but points within an area, the parking start position determined by the parking start position calculating section 46 may be defined by the positional area.

The information output control section 47 outputs a predetermined sound via a speaker 24 (see FIG. 1) and outputs steering guidance for guiding the vehicle to the parking start position via the speaker 24 and/or the display 22 (see FIG. 1). According to this information, the driver can understand the timing of starting to steer the steering wheel which enables driving the vehicle to the parking start position suited for the parking space.

The information output control section 47 determines whether the steering operation in response to the outputted steering guidance has been performed, based on the output signal of the steering angle sensor 16, for example. If it is determined that the steering operation in response to the outputted steering guidance has been performed, the information output control section 47 starts the process for guiding to the starting position as described hereafter. If the driver doesn't desire the notified parking space, the driver would continue to drive the vehicle around the parking area until the driver finds the desired parking space. In this case, since it will be determined that the steering operation in response to the outputted steering guidance has not been performed, new steering guidance will be outputted, when the parking space available flag is newly set for the newly detected parking space.

In executing the process for guiding the parking start position, the information output control section 47 recognizes the traveling pattern of the vehicle (a history of changes in position and orientation) based on the deflection angle α periodically calculated by the deflection angle calculating section 41 and outputs a variety of guidance for guiding the vehicle toward the parking start position determined by the parking start position calculating section 46.

For example, if necessary, the audio message or text message, such as "please start after moving toward the parking space a little bit more", "please start after moving away from the parking space a little bit more", "please start after increasing the inclination of the vehicle a little bit more", etc., may be output via the speaker 24 and/or the display 22 based on the relationship between the current vehicle position (and the direction) and the parking start position. With this process for guiding to the parking start position, it becomes easier for the driver to drive the vehicle to the parking start position suited for the parking space.

It is noted that when the vehicle has reached the parking start position, the information output control section 47 may output an audio message via the speaker 24 and/or the display 22 for urging the driver to stop the vehicle ("Please stop and return the position of the steering wheel to its original position", for example) may be output and/or automatic braking may be performed. Alternatively, the information output control section 47 may perform automatically intervened steering control for guiding the vehicle to the parking start position via steering means (not shown), and/or automatically intervened brake control via braking means when the vehicle reaches the parking start position.

Further, the information output control section 47 may output an audio message, such as "if you change the shift lever to the reverse range, the system can start to assist parking when the vehicle rolls backward", via the speaker 24 and/or the display 22, when the vehicle stops at the parking start position. With this audio message, the driver can grasp that the parking assisting apparatus 10 is now ready to assist with the parking.

If the information output control section 47 executes the process for guiding to the parking start position, it sets a experience flag which indicates as such. This experience flag represents for which parking space the parking start position guiding is now being executed. Therefore, once the experience flag has been set, the experience flag is not re-set (cleared) until the position of the vehicle largely departs from the parking space for which the parking start position guiding is executed. When the experience flag is cleared, the process for detecting a new parking space (and process for outputting information for notification and steering guidance, etc., will be performed, as long as the parking switch 52 is in an ON position.

The target parking position calculating section 44 starts process for calculating the target parking position when the reverse shift switch 50 is turned on in the parking start position, This target parking position calculation process executed by the target parking position calculating section 44 at the parking start position depends on the image (real image) captured by the back monitoring camera 20 (see FIG. 1), and thus different from the aforementioned target parking position calculation process executed based on the detection result of the distance-measuring sensor 70. In other words, the target parking position calculating section 44 of this embodiment performs the target parking position calculation process in more than two different manners, including the process for calculating the target parking position based on the detection result of the distance-measuring sensor 70 and the process for calculating the target parking position based on the captured image of the back monitoring camera 20. In the following, for convenience of distinction, the target parking position calculated based on the detection result of the distance-measuring sensor 70 is referred as to "a first target parking position" and the target parking position calculated based on the captured image of the back monitoring camera 20 is referred as to "a second target parking position".

The monitoring camera 20 is mounted on the backside of the vehicle such that it images a scene behind the vehicle with a predetermined viewing angle. The monitoring camera 20 may be a camera having image sensors, such as a charge coupled device and a complementary metal-oxide semiconductor device.

Figure 4:
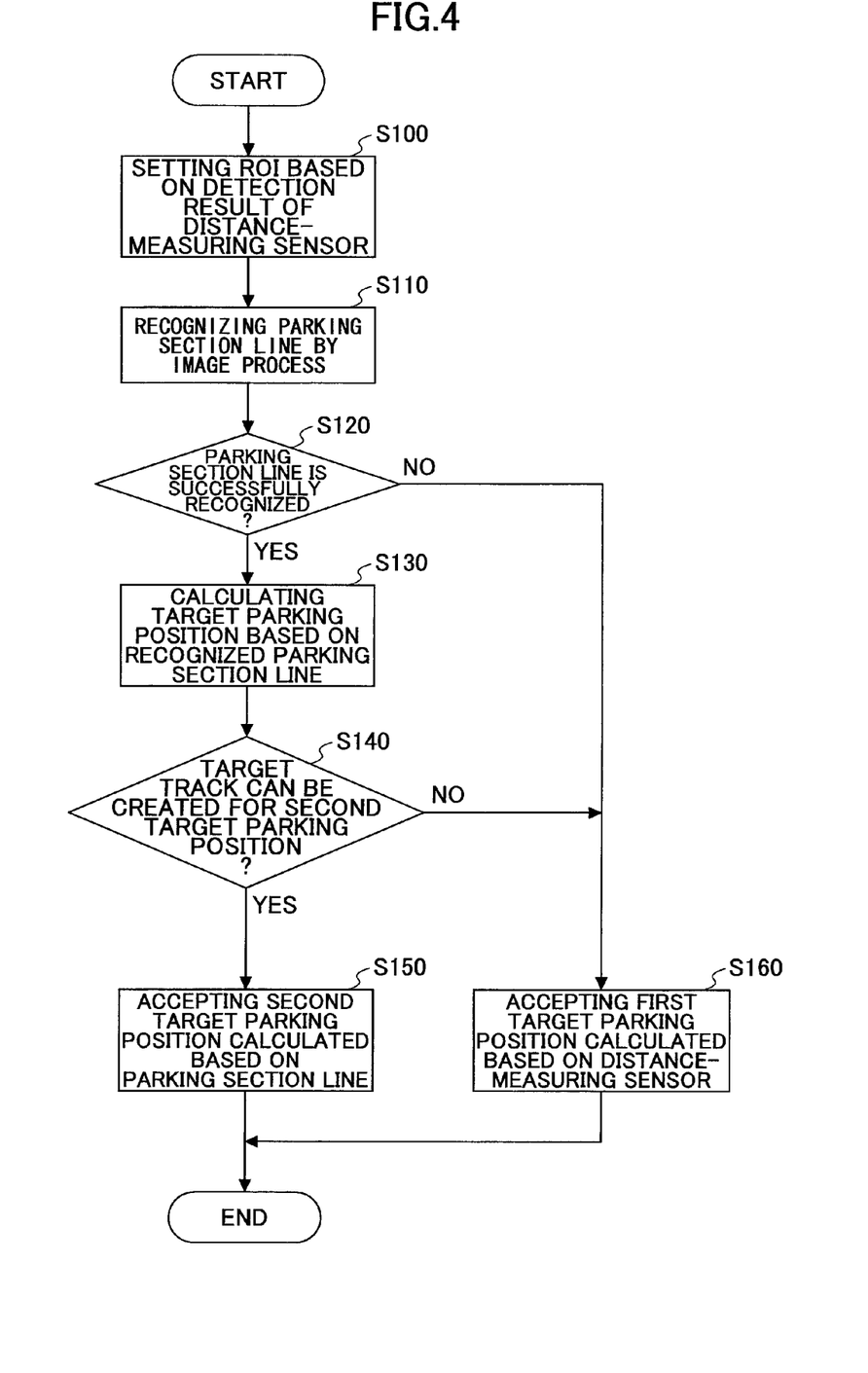
FIG. 4 is a flowchart of a target parking position calculation process which is executed if guidance for a parking start position is outputted.

FIG. 4 is a flowchart of a target parking position calculation process which is executed by the target parking position calculating section 44 (and target track calculating section 48). This process routine is initiated if the reverse shift switch 50 is turned on in the parking start position and the experience flag has been set (i.e., the vehicle is in the parking start position for which the parking start position guiding has been executed).

In step 100, at first, ROI (region of interest) is set based on the detection result of the distance-measuring sensor 70. The ROI is a region for detecting the parking section line which may be captured in the image, and may be a region whose size corresponds to the size of the actual parking section line in the image. For example, the ROI is set in a region predetermined with respect to the first target parking position. With this arrangement, it becomes possible to detect the parking section line with high accuracy while reducing the image recognition process load.

In step 110, image data in the ROI is processed for recognizing the parking section line. This process for recognizing the parking section line can be implemented variously, so any appropriate way may be utilized.

Here, an example of the process for recognizing the parking section line is described. In this example, feature points are extracted in the ROI. The feature points are extracted as points at which the rate of change of luminance exceeds a predetermined value. In other word, edges (i.e., outlines) which are defined by steep change in brightness are extracted. Then, coordinates of the respective pixels are converted from the local coordinate system of the camera to the real coordinate system by distortion correction. Then, liner approximation is applied to the edges (i.e., row of pixels of the feature points) to derive the outlines of the feature points. Then, a pair of the parallel outlines is detected as a parking section line, which is typically a white paint line.

In step 120, it is determined whether the parking section line in the image is successfully recognized in step 110. If it is determined that the parking section line in the image is successfully recognized in step 110 (i.e., if the pair of the parallel outlines is detected in the aforementioned example), this process routine goes to step 130.

Here, the case where the parking section line in the image is not successfully recognized may be the case where the parking section line cannot be recognized due to influence of insufficient light at night, underground parking area, etc. (i.e., influence on extraction of the edges), the positional relationship between the actual parking section line and the coverage of the back monitoring camera 20, snow cover, etc., or the fact that the parking section line doesn't exist in the first place. If it is determined that the parking section line in the image is not successfully recognized, this process routine goes to step 160. Alternatively, If it is determined that the parking section line in the image is not successfully recognized, the process for recognizing the parking section line may be executed by slightly changing the ROI. Also, in this case, if it is determined that the parking section line in the image is not successfully recognized, this process routine goes to step 160.

In step 130, the target parking position is calculated based on the parking section line. In this case, the target parking position (i.e., the second target parking position) at which the vehicle is accommodated within the parking section line without any bias is calculated. Again, the term "target parking position" may include "target parking direction" (i.e., a direction of the vehicle to be facing when the vehicle has been parked in the parking space). The target parking direction determined may be substantially parallel to the recognized parking section line.

In step 140, it is determined whether the target track can be created for the second target parking position (including the target parking direction, the same for the description hereafter). This process is executed by the target track calculating section 48 in association with the target parking position calculating section 44. The target track calculating section 48 calculates the target track (which is defined as a trajectory of the center of the rear axle of the vehicle) for guiding the vehicle to the second target parking position based on the relationship between the current vehicle position and the second target parking position, the cornering characteristics of the vehicle, etc. In this stage, the target track may be created by using a certain turning curvature less than a maximum turning curvature (e.g., 90 percent of the maximum turning curvature) of the vehicle in order to certify the correction of the target track in a later stage.

In the step 140, if the target track is created by the target track calculating section 48, the process routine goes to step 150, while if the target track cannot be created, that is to say, if the target track is not created by the target track calculating section 48, the process routine goes to step 160. Here, the case where the target track cannot be created may be the case where the current parking start position becomes unsuited for the second target parking position due to the fact that there is a large difference between the first target parking position and the second target parking position, for example. This results from the fact that the process for guiding to the starting position has been executed based on the parking starting position calculated based on the first target parking position.

In an alternative embodiment, the calculated second target parking position may be corrected so as that the target track can be created. However, in this embodiment, the corrected second target parking position should be the target parking position at which the vehicle is accommodated within the parking section line. In another alternative embodiment, if necessary, the calculated second target parking position may be corrected so as that the target track can be created, even if the corrected second target parking position becomes the target parking position at which the vehicle is not accommodated within the parking section line, as long as it is certified that there is no interference between the vehicle at the corrected second target parking position and the adjacent obstacle. In this case, image recognition results which are used for extracting the parking section line may be used for deriving information as to the adjacent obstacle. The way of recognizing the obstacle may be any way. For example, a larger ROI may be set, and among the outlines of the feature points obtained from the result of the liner approximation, the outline whose degree of parallelization with respect to the parking section line is larger than a predetermined value is recognized as the outline related to the obstacle. In this alternative embodiment, if the calculated second target parking position can be corrected so as that the target track can be created, the process routine goes to step 150, while if the calculated second target parking position cannot be corrected, the process routine goes to step 160.

In step 150, the second target parking position is set as the target parking position which is used for the subsequent parking assist (determination of the initial position of a target parking frame described later and the parking assist when the vehicle rolls backward to the target parking position.

In step 160, the first target parking position calculated based on the detection result of the distance-measuring sensor 70 is set as the target parking position which is used for the subsequent parking assist. Here, the first target parking position may be the same as the target parking position which is utilized in the process for guiding to the parking start position or may be corrected or recalculated based on the detection result of the distance-measuring sensor 70 obtained during the process for guiding the parking start position. The latter is suited for the parallel parking in particular, because the process for guiding to the parking start position may start before the obstacle on the back side of the parking space is detected by the distance-measuring sensor 70 or when only the front end of the front body of the obstacle on the back side of the parking space is detected, while it is possible to perform later correction using the information as to the obstacle on the back side of the parking space (more than the information as to the front end portion of the obstacle) which can be detected during the process for guiding to the parking start position.

In step 160, it is basically unnecessary to determine whether the target track can be created for the first target parking position calculated based on the detection result of the distance-measuring sensor 70. This is because the parking start position, from which the target track to the target parking position can be created, has been guided based on the detection result of the distance-measuring sensor 70, as described before.

Figure 5:
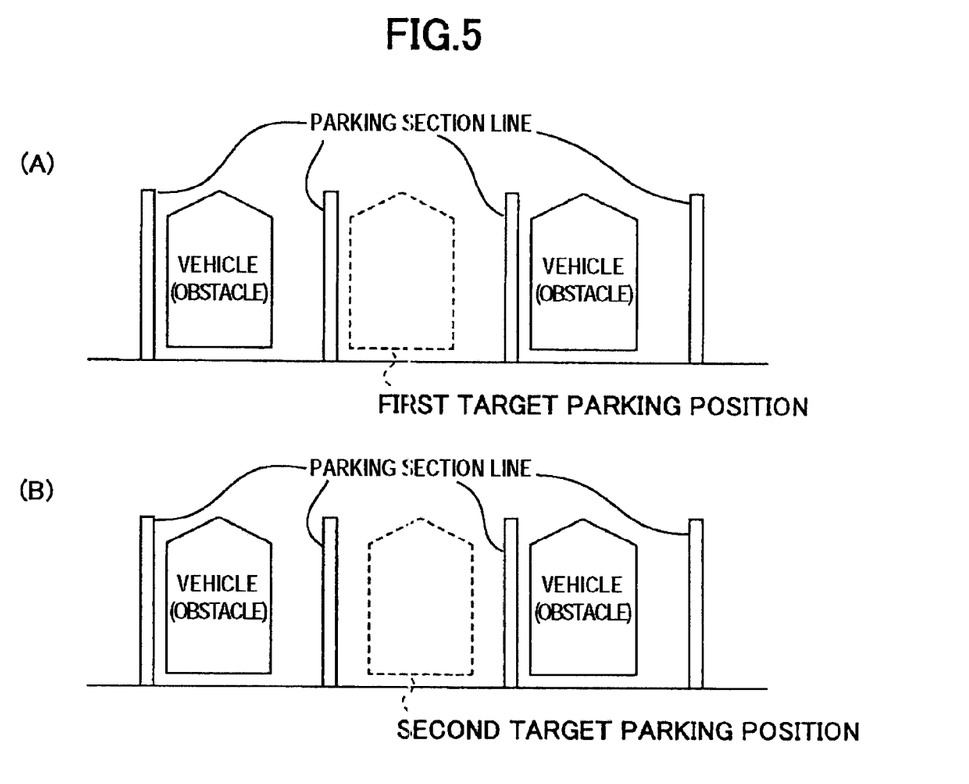
FIG. 5 is a plan view illustrating first and second target parking positions which are lopsided in different manners.

In this way, according to the present embodiment, the second target parking position calculated based on the detection result of the parking section line is used on a priority basis with respect to the first target parking position calculated based on the detection result of the distance-measuring sensor 70. Therefore, it is possible to set an appropriate target parking position even in a situation where another vehicle which is detected as an obstacle is parked in a biased manner with respect to the neighboring parking section line, for example. In other words, since the first target parking position based on the detection result of the distance-measuring sensor 70 is calculated with reference to the obstacle detected on each side of the parking space, it may be biased with respect to the parking section line, as shown by dotted lines in FIG. 5A. To the contrary, according to the present embodiment, since the second target parking position based on the detection result of the parking section line is used on a priority basis, it is possible to set a target parking position without any bias with respect to actual parking section line even in the same situation, as shown by dotted lines in FIG. 5B.

Further, according to the present embodiment, since the first target parking position is used in the case where the parking section line cannot be recognized or the target track cannot be created for the second target parking position, it is possible to avoid such a situation where the parking assist for the detected parking space (i.e., the parking assist when the vehicle rolls backward to the target parking position) cannot be performed in spite of the fact that the process for guiding to the parking start position has been performed which otherwise could impose an inconvenience on the driver.

Figure 6:
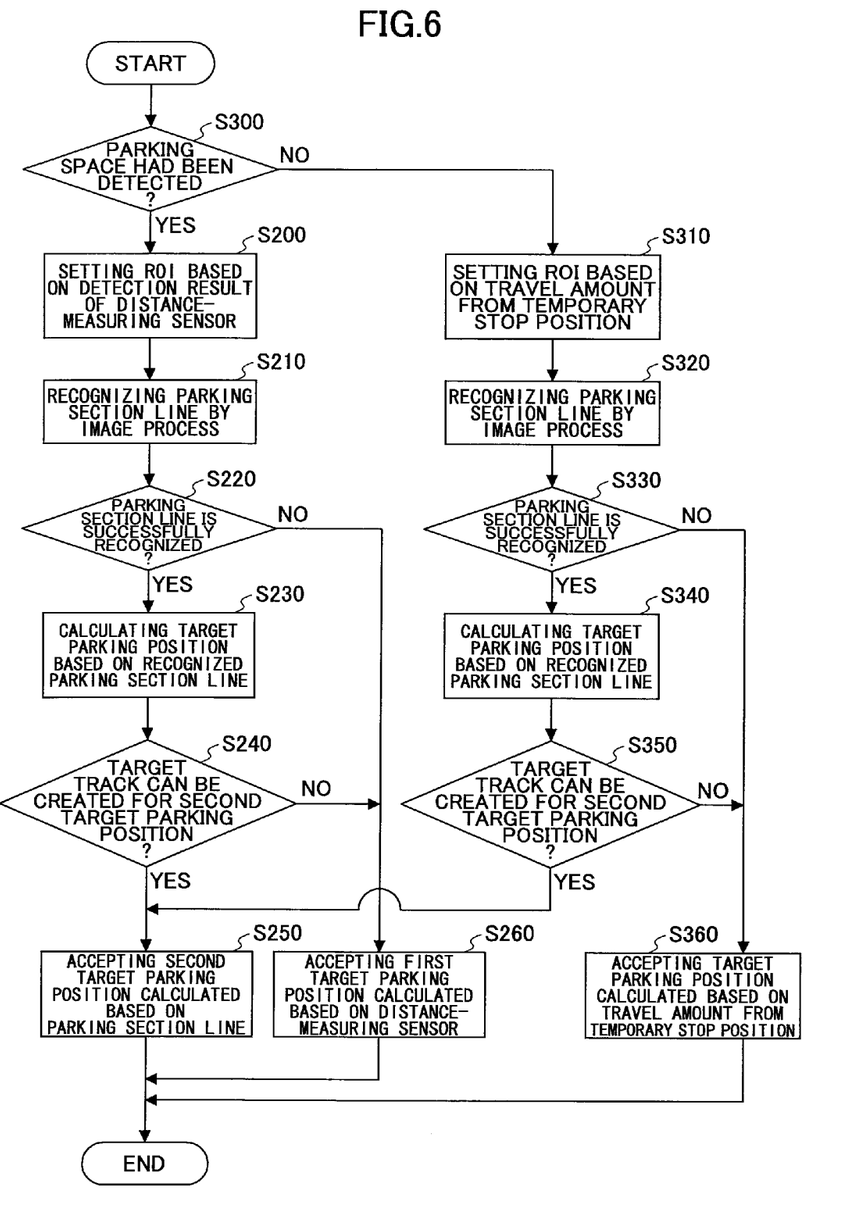
FIG. 6 is a flowchart of a target parking position calculation process which is executed if guidance for a parking start position is not outputted.

FIG. 6 is a flowchart of a target parking position calculation process which is executed by the target parking position calculating section 44 (and target track calculating section 48) at the parking start position. This process routine is initiated if the reverse shift switch 50 is turned on under the situation where the experience flag, which represents the fact that the process for guiding the parking start position has been performed, has not been set. In other words, this process routine is initiated if the reverse shift switch 50 (and the parking switch 52) is turned on at the parking start position, after the driver drives the vehicle to the parking start position on his own without guidance for the parking start position.

In step 300, it is determined whether parking space had been detected. Specifically, the detection result (i.e., row of points) of the distance-measuring sensor 70, and the detection results of the steering angle sensor 16 and the vehicle speed sensor 18, which are obtained before the reverse shift switch 50 is turned on and stored in the memory 72, are read out from the memory 72. In this case, the detection result (i.e., row of points) of the distance-measuring sensor 70 which are obtained within a predetermined distance before the current vehicle position (i.e., the parking start position) is read out from the memory 72. Then, it is determined whether there is any parking space available with respect to the current vehicle position by grasping the situation of the obstacles (including various flag set conditions) before the current vehicle position based on the detection result of the distance-measuring sensor 70 read out from the memory 72. This determination is performed according to the aforementioned way of detecting a parking space considering the difference in parking modes. In other words, it is determined whether the parking space available flag can be set at the current vehicle position based on the past detection data. If it is determined that there is parking space available with respect to the current vehicle position, the process routine goes to step 200, while if it is determined that there is no parking space available, the process routine goes to step 310.

The processes from step 200 to step 260 may be the same as the processes from step 100 to step 160 which are mentioned before with reference to the flowchart of FIG. 4, and thus explanations about these steps are omitted.

In step 310, the ROI is set based on the travel amount of the vehicle from a temporary stop position of the vehicle. Specifically, if it is determined that there is a temporary stop position in the course of traveling to the parking start position (for example, if it is determined that there is a temporary stop position within traveling distance of 6.5 m before the parking start position, in the case of parallel parking), the target parking position calculating section 44 sets the target parking position at the point which has a predetermined relationship with respect to the temporary stop position. It is noted that the way of determining the target parking position based on the temporary stop position is described in JP2004-345496 A, for example, the entire contents of which are hereby incorporated herein by reference. If it is determined that there is no temporary stop position in the course of traveling to the parking start position based on the detection result of the vehicle speed sensor 18, the target parking position calculating section 44 calculates the target parking position based on the variation in deflection angles α (learned values) in the course of traveling to the parking start position. In the following, the target parking position calculated based on the temporary stop position or the learned values of the deflection angles α is referred as to "a third target parking position". Then, the ROI may be set in a region predetermined with respect to the third target parking position.

In step 320, the process for recognizing the parking section line in the image is performed. This process may be the same as the process of step 110 mentioned before with reference to the flowchart of FIG. 4.

In step 330, it is determined whether the parking section line is successfully recognized as a result of the recognition process for the image data in the ROI of the image. If it is determined that the parking section line is successfully recognized, the process routine goes to step 340, while if it is determined that the parking section line is not successfully recognized, the process routine goes to step 360.

In step 340, the target parking position is calculated based on the recognized parking section line. In this case, the target parking position (i.e., the second target parking position) at which the vehicle is accommodated within the parking section line without any bias is calculated.

In step 350, it is determined whether the target track can be created for the second target parking position. If it is determined that the target track can be created for the second target parking position, the second target parking position is set as the target parking position which is used for the subsequent parking assist, in step 250.

In step 360, the third target parking position calculated based on the temporary stop position or the learned values of the deflection angles α is set as the target parking position which is used for the subsequent parking assist.

In this way, according to the present embodiment, the second target parking position calculated based on the detection result of the parking section line is used on a priority basis with respect to the third target parking position calculated based on the temporary stop position or the learned values of the deflection angles α(or the first target parking position calculated based on the detection result of the distance-measuring sensor 70. Therefore, it is possible to set an appropriate target parking position even in a situation where another vehicle which is detected as an obstacle is parked in a biased manner with respect to the neighboring parking section line, for example. Further, according to the present embodiment, since the first target parking position or the third target parking position is used in the case where the parking section line cannot be recognized or the target track cannot be created for the second target parking position, it is possible to determine an appropriate target parking position according to the situation.

Further, according to the present embodiment, even if the parking switch 52 is not turned on in the course of traveling to the parking start position and thus the process for guiding to the starting position is not performed, it is possible to recognize the parking space or the temporary stop position in a later stage and determine the first target parking position or the third target parking position based on the recognized parking space or temporary stop position.

Figure 7:
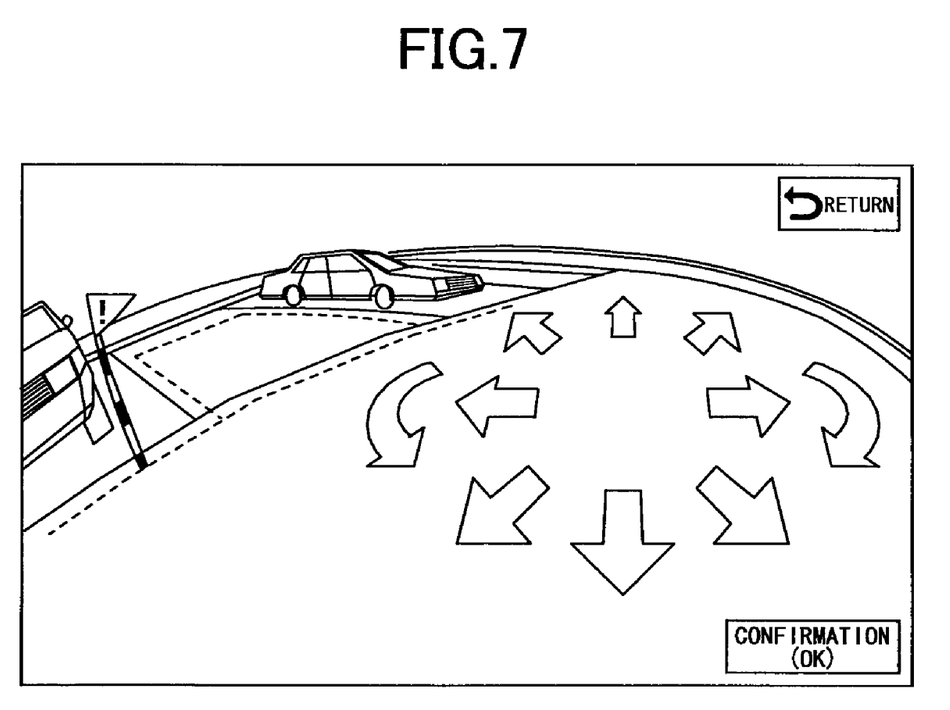
FIG. 7 is an image of an example of a touch switch panel for setting a target-parking position on the display 22.

Next, the parking assist which may be performed when the vehicle rolls backward from the parking start position to the parking space is explained with reference to FIGS. 7 and 1.

When the reverse shift switch 50 is turned on in the parking start position, the parking assisting ECU 12 displays the image (real image) captured by the back monitoring camera 20 on the display 22 provided in the cabin. Then, a target parking frame is superposed on the captured image on the display 22, as shown in FIG. 7 (screen for parallel parking). The target parking frame may be a pictorial display which imitates an actual parking frame or an outside shape of the vehicle. For example, the target parking frame may have a form whose position and direction users can recognize. Two types of target parking frames may be prepared for parallel parking and tandem parking, respectively.

The initial position and direction of the target parking frame displayed on the display 22 corresponds to the set target parking position (i.e., one of the first, second and third target parking positions). The initial position and direction of the target parking frame may be confirmed by the user as they are, when the user operates the confirmation switch, for example. Or, the position and direction of the target parking frame may be adjusted with touch switches, etc., for moving the target parking frame in lateral and longitudinal directions and in directions of rotation, as shown in FIG. 7, before operating the confirmation switch.

Then, the target track calculating section 48 calculates the target track (which is defined as a trajectory of the center of the rear axle of the vehicle) for guiding the vehicle to the position in the real space which corresponds to the position of the target parking frame, based on the position of the target parking frame in the captured image, and calculates target steering angles to be implemented at respective points on the target track. Preferably, the target track calculating section 48 calculates the target track and the target steering angles when the target parking frame is initially displayed as mentioned before, as well as when the position of the target parking frame is changed. Then, if the target parking frame is in the position in which the parking assist cannot be implemented (i.e., in which it is impossible to calculate the appropriate target track and target steering angles), the target parking frame may be displayed in red color (or the confirmation switch may be enabled). It is noted that according to the present embodiment, since the target parking position for which the target track can be created is set, as described in connection with FIG. 4 and FIG. 6, it doesn't occur that the target parking frame is initially displayed in red color.

When the position and direction of the target parking frame are confirmed, the target parking position calculating section 44 and the target track calculating section 48 determine the resultant target parking position based on the confirmed position and direction of the target parking frame, and determine a target track for the determined target parking position. When the vehicle starts to roll backward, the parking assisting ECU 12 estimates the position of the vehicle during the parking assist control using the travel distance of the vehicle derived from the output signals of the vehicle speed sensor 18 and the steering position derived from the output signals of the steering angle sensor 16. Then, the parking assisting ECU 12 calculates a target steering angle as a function of the amount of departure of the estimated vehicle position from the target track. The parking assisting ECU 12 transmits the calculated target steering angle to the steering system ECU 30. The steering system ECU 30 controls the motor 32 so as to implement the target steering angle. The motor 32 may be disposed in a steering column for rotating a steering shaft by its rotating angle.

It is noted that the target track calculating section 48 may estimate the position of the vehicle during the parking-assist control based on the output signals of the steering angle sensor 16 and the vehicle speed sensor 18, calculate a target track based on the difference between the target track previously calculated and the vehicle position estimated by the vehicle position estimating section 40, and determine a target steering angle at the vehicle position based on the calculated target track. This calculation of the target track may be performed at every predetermined travel distance of the vehicle (0.5 m, for example). At that time, the target track calculating section 48 may correct the target parking position (and thus recalculate the target track), if necessary, based on the results of the parking frame recognition process for the captured image of the back monitoring camera 20. In this case, even if one of the first and the third target parking positions is selected before the vehicle starts to roll backward, the parking assist may be performed based on the second target parking position which is the most reliable after the vehicle starts to roll backward.

The parking assisting ECU 12 requests the driver to stop the vehicle (or controls the vehicle to stop automatically using the automatic braking system) when the vehicle finally arrives at the target parking position in the target parking direction within the parking space, and then terminates the parking assist control.

The present invention is disclosed with reference to the preferred embodiments. However, it should be understood that the present invention is not limited to the above-described embodiments, and variations and modifications may be made without departing from the scope of the present invention.

For example, although in the above-described embodiments the information as to the orientation of the vehicle is obtained and derived from the vehicle speed sensor 18, the steering angle sensor 16 and the deflection angle calculating section 41, the detection results of a yaw rate sensor, a gyroscopic sensor, a declinometer, a GPS sensor, etc., may be used in addition to it or instead of it.

Further, although in the above-described embodiments various applications are initiated when the parking switch 52 is turned on, the present invention is not limited to this configuration. For example, they may be initiated if the vehicle speed is lower than a predetermined speed and it is determined that the vehicle position is located in the parking area based on the map data of a navigation device, even in the condition where the parking switch 52 is not turned on. In this case, such a configuration where there is no parking switch 52 can be contemplated.

Further, although in the above-described embodiments the distance-measuring sensor 70 suited for detecting the obstacle is used, it is also possible to detect the obstacle by means of image recognition of the camera.

Further, although in the above-described embodiments the obstacle is assumed to be a vehicle for the purpose of convenience of explanation, the obstacle may include any tangible goods such as a bicycle, a motorbike, walls, more than two pylons, etc.

The present application is based on Japanese Priority Application No. 2006-120975, filed on Apr. 25, 2006, the entire contents of which are hereby incorporated by reference.

The invention claimed is:

1. A parking assisting apparatus for assisting parking a vehicle, comprising:
   an imaging device mounted on the vehicle, the imaging device being configured to capture an image of surroundings;
   an obstacle detecting device configured to detect an obstacle; and
   a parking section line detecting device configured to detect a parking section line painted on a ground, the parking section line detecting device being configured to determine a region of interest within the image captured by the imaging device based on a detection result of the obstacle detecting device and based on a position of the obstacle detected by the obstacle detecting device, the parking section line detecting device being configured to process only the region of interest within the image captured by the imaging device to detect the parking section line, and the apparatus being configured to calculate a target parking position based on the detected parking section line if the parking section line is detected by the parking section line detecting device.

2. The parking assisting apparatus as claimed in claim 1, the obstacle detecting device being configured to detect a parking space; and the parking section line detecting device being configured to set the region of interest within the image captured by the imaging device at least within the detected parking space if the parking space is detected by the obstacle detecting device.

3. The parking assisting apparatus as claimed in any one of claims 1 and 2, said apparatus being configured to calculate the target parking position based on the detection result of the obstacle detecting device if the parking section line is not detected by the parking section line detecting device.

4. The parking assisting apparatus as claimed in any one of claims 1 and 2, said apparatus being configured to calculate a target parking position based on the detected parking section line if the parking section line is detected by the parking section line detecting device and a target track, along which the parking assisting for the detected parking section line can be implemented, can be generated.

5. The parking assisting apparatus as claimed in any one of claims 1 and 2, further comprising:

an information outputting device configured to output a guiding message for assisting in driving the vehicle to a parking start position if a parking space is detected based on the detection result of the obstacle detecting device, said apparatus being configured to calculate a target parking position based on the detection result of the obstacle detecting device under the situation where the guiding message has been outputted by the information outputting device, if the parking section line is not detected by the parking section line detecting device or a target track along which the parking assisting for the detected parking section line can be implemented cannot be generated in spite of the fact that the parking section line is detected by the parking section line detecting device.

6. A parking assisting method of assisting parking a vehicle, comprising:

an imaging step for capturing, with an imaging device mounted on the vehicle, an image of surroundings;

an obstacle detecting step for detecting, with an obstacle detecting device, an obstacle;

a parking section line detecting step for detecting, with a parking section line detecting device, a parking section line painted on a ground, said parking section line detecting step being carried out in a stage where the vehicle reaches a parking start position after the obstacle detecting step, said parking section line detecting step including determining a region of interest within the image captured by the imaging device based on a detection result of the obstacle detecting step and based on a position of the obstacle detected during the obstacle detecting step, and said parking section line detecting step including processing only the region of interest within the image captured by the imaging device to detect the parking section line; and a target parking position calculating step for calculating, with a target parking position determining device, a target parking position, said target parking position calculating step being carried out after the parking section line detecting step, and said target parking position calculating step including calculating said target parking position based on the detected parking section line if the parking section line is detected in the parking section line detecting step.

7. The parking assisting apparatus as claimed in claim 1, the parking section line detecting device being configured to determine the region of interest such that the region of interest has a size corresponding to a size of an actual parking section line in the image captured by the imaging device.

8. The parking assisting apparatus as claimed in claim 1, the parking section line detecting device being configured to determine the region of interest such that the region of interest is a predetermined region of interest with respect to a target parking position determined based on the detection result of the obstacle detecting device.

9. The parking assisting method as claimed in claim 6, said determining a region of interest within the image captured by the imaging device comprising determining a region of interest having a size corresponding to a size of an actual parking section line in the image captured by the imaging device.

10. The parking assisting method as claimed in claim 6, said determining a region of interest within the image captured by the imaging device comprising determining the region of interest such that the region of interest is a predetermined region of interest with respect to a target parking position determined based on the detection result of the obstacle detecting step.

* * * * *